Figure 1:
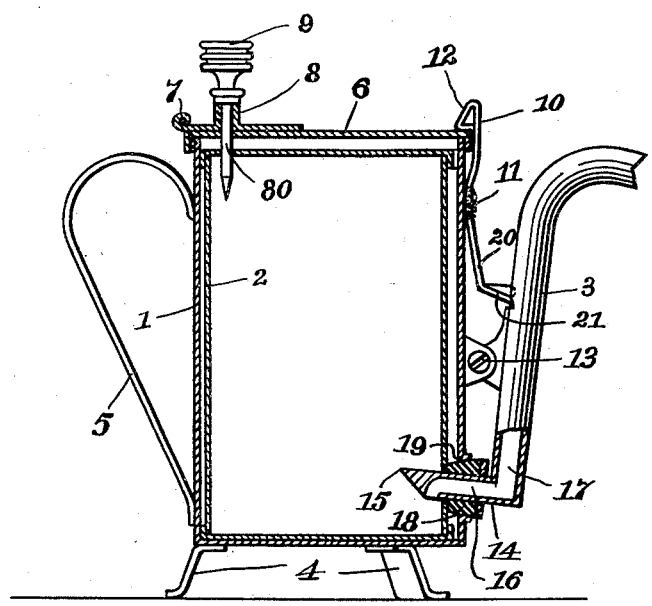

H. BURKERT.
HYGIENIC CAN SERVER.
APPLICATION FILED JUNE 4, 1920.

1,366,714.

Patented Jan. 25, 1921.

Inventor
Henry Burkert,
By Frederick V. Winter
Attorney.

UNITED STATES PATENT OFFICE.

HENRY BURKERT, OF NEW YORK, N. Y.

HYGIENIC CAN-SERVER.

1,366,714.　　　　　Specification of Letters Patent.　　Patented Jan. 25, 1921.

Application filed June 4, 1920. Serial No. 386,644.

*To all whom it may concern:*

Be it known that I, HENRY BURKERT, a citizen of the United States, residing at New York, in the county and State of New York, have invented certain new and useful Improvements in Hygienic Can-Servers, of which the following is a full, clear, and exact specification.

This invention relates to milk can containers and servers, and has for its object to provide a device of this kind capable of inclosing a milk can and serving its contents in a hygienic manner, without loss of any portion of the contents of the can and so as to prevent dust and flies from settling on the top of the can. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 2:
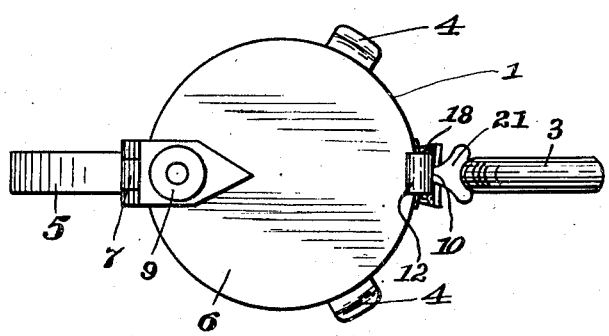

Figure 1 is a central vertical section of a can server made substantially in accordance with this invention, showing a can inclosed therein and ready for serving, and Fig. 2 is a plan view of the server.

The server consists of a cylindrical container 1 which may be made in any suitable dimensions to receive a milk can 2, and a spout 3 through which the contents of the can is poured in serving. The container 1 is preferably supported on legs 4 and has a handle 5 and cover 6, the latter being preferably hinged at 7. Said cover carries a perforated stud 8 through which a pin or perforating member 80 may be inserted for forming a vent hole in the top of the can 2. The pin 80 is preferably fitted with a knob 9 by which it may be conveniently grasped in the hand of the operator. The cover is retained in closed position by a spring catch 10 soldered or otherwise secured to the container at 11. Said catch has an inclined lip 12 whereby it is automatically pressed out of the way when the cover is closed, after which said catch will snap over the top of the cover and hold it in closed position until the catch is manually displaced.

The spout 3 is pivoted or hinged to the container intermediate of its ends at 13. The lower end of said spout has an inwardly bent portion 14 terminating in a perforating point 15. Said bent portion 14 has a branch passage 16 formed therein leading to the passage 17 in the spout proper, the branch passage 16 terminating on the lower face of the bent portion adjacent the point 15. Said bent portion is surrounded with a rubber gasket 18 which has a conical surface to snugly fit an opening 19 in the container 1 and bear against the can 2 after the point 15 has been driven through said can as shown in Fig. 1. Said gasket is designed to prevent leakage from the can around the bent portion 14 and perforating point 15, and further, in case any such leakage should accidentally occur, by tightly fitting the opening 19 in the container said gasket prevents such leakage from escaping from the container.

The spout is retained with the gasket engaged with the can and opening 19 in the container under the pressure of a spring 20 which engages the upper portion of the spout above its hinge 13 and by pressing said upper end portion of the spout away from the container serves to hold the lower end portion of said spout, which carries the bent portion 14 with the perforating point 15 and gasket 18, inward under constant pressure of the spring. Said spring 20 may be made integral with the spring catch 10, as shown in Fig. 1, and has its lower end portion bent sharply outward, as at 21 so as to have a more direct bearing upon the spout. Said bent portion 21 of the spring is forked or bifurcated, as best shown in Fig. 2 to straddle the spout and prevent the latter from becoming accidentally disengaged therefrom.

When a can is to be placed in the container for serving, the cover 6 is released, by displacing the catch 10, and swung open, and the spring 20 is displaced so that the lower end of the spout may be withdrawn from the container. The can may then be inserted and pushed down until its bottom rests on the bottom of the container. The lower bent end portion of the spout is then forced inward causing the point 15 to perforate and enter the can, and the gasket to close the opening 19 in the container and to engage the can around the opening formed therein. The spring 20, being released during the perforating of the can by the point 15, or immediately thereafter, will engage the upper end portion of the spout above the hinge 13 thereof and retain the gasket in the position shown in Fig. 1, as already explained.

Having thus described my invention, what I claim as new and desire to secure by Letters Patent of the United States is:—

1. In a can server, the combination with a container, of a spout hinged to said container, a perforating point on the lower end of said spout and provided with a passage leading to that in the spout, and a spring secured to the container and having a forked end embracing and bearing against the spout for the purpose specified.

2. In a can server, the combination with a container, of a spout hinged to said container, a perforating point on the lower end of said spout and provided with a passage leading to that in the spout, a cover hinged to the container, and a resilient leaf secured to the container intermediate of the ends of said leaf, one end of said leaf constituting a catch for retaining the cover in closed position, and the other end of said leaf engaging the spout for holding the perforating point in the can.

3. In a can server, the combination with a container, of a spout hinged to said container, a perforating point on the lower end of said spout and provided with a passage leading to that in the spout, there being an opening in the container through which said point extends, and a conical gasket on the spout adjacent said point, the end of said gasket engaging the can and its conical surface closely fitting said opening in the container for the purposes specified.

4. In a can server, the combination with a container, of a spout hinged to said container, a perforating point on the lower end of said spout and provided with a passage leading to that in the spout, there being an opening in the container through which said point extends, a conical gasket on the spout adjacent said point, the end of said gasket being adapted to engage the can around the point and the conical surface of said gasket being adapted to fit said opening in the container with a wedging action, and means for pressing said gasket into contact with said can and opening in the container for the purposes specified.

In testimony whereof I have signed my name to this specification.

HENRY BURKERT.